United States Patent
De Oliveira Fanti et al.

(10) Patent No.: US 12,507,333 B2
(45) Date of Patent: Dec. 23, 2025

(54) HEADLAMP WITH AN AI UNIT

(71) Applicant: OBER ALP S.P.A., Bolzano (IT)

(72) Inventors: Raphael De Oliveira Fanti, Lavis (IT); Hannes Egarter, Bolzano (IT)

(73) Assignee: OBER ALP S.P.A., Bozen (IT)

(*) Notice: Subject to any disclaimer, the term of this patent is extended or adjusted under 35 U.S.C. 154(b) by 0 days.

(21) Appl. No.: 18/154,653

(22) Filed: Jan. 13, 2023

(65) Prior Publication Data
US 2023/0171868 A1    Jun. 1, 2023

Related U.S. Application Data

(63) Continuation of application No. 16/953,985, filed on Nov. 20, 2020, now Pat. No. 11,558,945.

(30) Foreign Application Priority Data

Nov. 22, 2019  (EP) ..................... 19210952

(51) Int. Cl.
*H05B 47/17*     (2020.01)
*G05B 13/02*    (2006.01)
*H05B 47/105*   (2020.01)

(52) U.S. Cl.
CPC ......... *H05B 47/17* (2020.01); *G05B 13/0265* (2013.01); *H05B 47/105* (2020.01)

(58) Field of Classification Search
CPC ........ G06F 9/468; G06F 9/5011; G06F 21/32; G06F 21/564; G06F 2209/5013; G06F 2221/2141; G06F 21/33; G06N 20/00; H04L 63/0846; H04L 63/068; H04L 63/101; H04L 67/14; H04L 67/22; H04L 67/306

See application file for complete search history.

(56) References Cited

U.S. PATENT DOCUMENTS

| | | | |
|---|---|---|---|
| 6,554,444 B2 | 4/2003 | Shimada et al. | |
| 7,370,991 B1 | 5/2008 | Ellis-Fant | |
| 8,297,776 B2 | 10/2012 | Baudou | |

(Continued)

FOREIGN PATENT DOCUMENTS

| | | | |
|---|---|---|---|
| CN | 101155213 A | 4/2008 | |
| CN | 105090760 A | 11/2015 | |

(Continued)

OTHER PUBLICATIONS

European Search Report in related application No. EP19210952, dated Apr. 14, 2020.

(Continued)

*Primary Examiner* — Daniel D Chang
(74) *Attorney, Agent, or Firm* — Sterne, Kessler, Goldstein & Fox P.L.L.C.

(57) ABSTRACT

A portable lamp 100, preferably a headlamp 100, which is adapted to be worn or carried by a user, comprising: at least one light source 114, an AI unit 120, wherein the AI unit 120 comprises an activity classification unit 122 and a control unit 124, wherein said activity classification unit 122 is able to automatically classify an activity which the user is currently carrying out without any manual setting by the user, wherein said control unit 124 is adapted to control the beam of said at least one light source 114 at least based on the classified activity of the user.

16 Claims, 5 Drawing Sheets

(56) References Cited

U.S. PATENT DOCUMENTS

| | | |
|---|---|---|
| 8,378,587 B2 | 2/2013 | Huguenin et al. |
| 8,746,914 B2 | 6/2014 | Nelson et al. |
| 8,882,287 B2 | 11/2014 | Taylor |
| 8,885,877 B2 | 11/2014 | Publicover et al. |
| 8,894,231 B2 | 11/2014 | Kwok |
| 9,033,505 B2 | 5/2015 | Kim et al. |
| 9,452,705 B2 | 9/2016 | Bouffay et al. |
| 9,469,241 B2 | 10/2016 | Genthon et al. |
| 9,495,589 B2 | 11/2016 | Strombom et al. |
| 9,593,834 B2 | 3/2017 | Lee |
| 9,609,722 B2 | 3/2017 | Law |
| 9,648,692 B2 | 5/2017 | Bortolotti et al. |
| 9,723,887 B2 | 8/2017 | Kim |
| 9,862,303 B2 | 1/2018 | Nogha Mbai et al. |
| 10,012,372 B2 | 7/2018 | Marie et al. |
| 10,016,122 B2 | 7/2018 | Orringer et al. |
| 10,066,818 B2 | 9/2018 | Ormsbee et al. |
| 10,132,483 B1 | 11/2018 | Feinbloom et al. |
| 10,178,743 B2 | 1/2019 | Bortolotti et al. |
| 10,344,960 B2 | 7/2019 | Boesen |
| 10,345,238 B2 | 7/2019 | Van Bommel et al. |
| 10,539,788 B2 | 1/2020 | Shrubsole et al. |
| 10,667,357 B1 | 5/2020 | Feinbloom et al. |
| 10,816,939 B1 | 10/2020 | Coleman |
| 11,002,437 B2 | 5/2021 | Ross |
| 11,350,506 B1 | 5/2022 | De Oliveira Fanti et al. |
| 2008/0310145 A1 | 12/2008 | Blake et al. |
| 2009/0251070 A1 | 10/2009 | Petzl et al. |
| 2011/0037419 A1 | 2/2011 | Hoffman et al. |
| 2015/0003048 A1 | 1/2015 | Chang |
| 2016/0258599 A1* | 9/2016 | Genthon ............... F21V 14/003 |
| 2016/0295658 A1 | 10/2016 | Chraibi et al. |
| 2017/0231053 A1 | 8/2017 | Underwood et al. |
| 2017/0347432 A1* | 11/2017 | Blum ................ H05B 47/11 |
| 2018/0092547 A1* | 4/2018 | Tzvieli ................ A61B 5/0935 |
| 2018/0136486 A1 | 5/2018 | MacNamara et al. |
| 2018/0160085 A1 | 6/2018 | Bazin et al. |
| 2018/0190095 A1 | 7/2018 | Leegate et al. |
| 2018/0249054 A1 | 8/2018 | Chien |
| 2019/0101977 A1* | 4/2019 | Armstrong-Muntner ................... G06F 3/011 |
| 2019/0350069 A1 | 11/2019 | Van Der Zwaag et al. |
| 2020/0170092 A1 | 5/2020 | Lange |
| 2020/0314986 A1 | 10/2020 | Luijcks |
| 2021/0112647 A1 | 4/2021 | Coleman |
| 2021/0160991 A1 | 5/2021 | De Oliveira Fanti et al. |
| 2022/0408532 A1 | 12/2022 | De Oliveira Fanti et al. |

FOREIGN PATENT DOCUMENTS

| | | |
|---|---|---|
| CN | 205919149 U | 2/2017 |
| CN | 106764594 A | 5/2017 |
| CN | 206280784 U | 6/2017 |
| CN | 107588340 A | 1/2018 |
| CN | 107816647 A | 3/2018 |
| CN | 107830432 A | 3/2018 |
| CN | 108443799 A | 8/2018 |
| DE | 10 2014 108 677 A1 | 12/2015 |
| DE | 10 2015 102 114 A1 | 10/2016 |
| DE | 20 2017 102 318 U1 | 6/2017 |
| DE | 10 2017 108 315 A1 | 10/2018 |
| TW | 201542960 A | 11/2015 |
| WO | WO 2019/015612 A1 | 1/2019 |

OTHER PUBLICATIONS

International Search Report and Written Opinion of the International Searching Authority directed to International Patent Application No. PCT/IB2022/054084, mailed Aug. 1, 2022; 14 pages.

\* cited by examiner

HEADLAMP WITH AN AI UNIT

The present invention relates to a portable lamp, preferably a headlamp which is mainly used for sport and leisure outdoor activities and a method for controlling at least one light source of such a portable lamp.

Portable lamp, especially headlamp, is one of the most useful and important gadgets for outdoor activities. A headlamp can usually be worn on the forehead of a user and is thus able to illuminate the key area while keeping the user's hands free.

For traditional headlamps, a user needs to manually set the geometry and brightness of the lighting. However, in recent years, there has been a growing tendency that headlamps become more and more electronically controllable, wherein they become able to automatically adjust and adapt the light beam to the environment.

However, it should be noted that the needed brightness and geometry of the light beam usually differ from one user activity to another. For example, the lighting mode for running should be different as the lighting mode for camping, as running requires a high proportion of focused beam of light for illuminating the way ahead, while camping needs a high proportion of wide beam of light for enabling a broad vision of the environment and avoiding blinding other people nearby with focused beam on their eyes.

Therefore, in order to produce a good lighting experience, some of such headlamps may comprise e.g. a USB port or a Bluetooth interface for connection with a computer or a smartphone of the user, from where the user could use an App to preset the lighting mode of the headlamp for a specific sport or outdoor activity which the user is about to take, wherein each lighting mode has a specific profile or rules for automatic lighting adjustment.

Furthermore, each user may have a different preference or perception of the brightness or geometry of the light beam. In order to adapt the setting of the lighting to the user preference, the user has to configure the adjusting parameters of each chosen activity manually or in an app on the computer or smartphone, which is not only time consuming, but also unintuitive, wherein a relative satisfied result can sometimes only be achieved after many iterations of configuring and testing.

The objective of the present invention is thus to provide an improved headlamp and a method for controlling the lighting of such a headlamp, which address the above discussed disadvantages.

According to a first aspect of the present invention, this objective is achieved by a portable lamp, preferably a headlamp, which is adapted to be worn or carried by a user, comprising: at least one light source, an AI unit, wherein the AI unit comprises an activity classification unit and a control unit, wherein said activity classification unit is able to automatically classify an activity which the user is currently carrying out without any manual setting by the user, wherein said control unit is adapted to control the beam of said at least one light source at least based on the classified activity of the user.

AI refers to Artificial Intelligence, which is defined by John McCarthy, one of the founders of the discipline of AI, as "the science and engineering of making intelligent machines." It should be noted that under this definition machine learning is a subset of AI, but AI does not need to necessarily have a machine learning capability, wherein rule engines, expert systems and knowledge graphs could all be described as AI. The present application uses this definition, such that the AI unit refers to unit capable of algorithm-based decision making, or any intelligent unit with or without machine learning capabilities.

The at least one light source in the present application can be one single light source, which comprises e.g. a plurality of LED diodes, wherein the brightness and/or the geometry of the beam of the light source is controllable.

The headlamp could also comprise two or more light sources, wherein each light source has a specific geometry of beam, for example one light source with a focused beam, and another one with a wide beam, so that the headlamp can switch between these light sources to get a desired or suitable beam geometry, wherein the brightness of each light source is preferably controllable.

It is up to a person skilled in the art to implement the at least one light source using any suitable type of controllable optics.

The AI unit comprises an activity classification unit, wherein the activity classification unit is able to automatically classify an activity which the user is currently carrying out without any manual setting by the user. In this way, a pre-setting of a specific activity of the user using manual setting units like buttons, or an app on a computer or a smartphone is not needed any more. Instead, the activity of the user will be automatically recognized by the activity classification unit, which not only saves time of the user, but also enables a more intuitive and convenient user experience.

The AI unit further comprises a control unit. Based on the classified activity, the algorithms or rules associated with this activity will be applied for controlling the light source. The control unit uses these controlling algorithms or rules to automatically control the beam of the at least one light source, including the geometry and the brightness of the beam.

In order to automatically classify the activity of the user or control the beam of light according to the environment, the features or the motions of the user and/or the nearby environment where the user is taking the activity need to be detected. For such detection, sensors are needed. Thus, in a preferred embodiment, the lamp further comprises at least one sensor, wherein the captured sensor data of the at least one sensor are adapted to be transmitted to the activity classification unit and/or to the control unit, wherein the at least one sensor comprises at least one of the following: an inertial sensor, a GPS sensor, a compass sensor, a distance-to-objects sensor, a precision time tracker, an optical detector such as an ambient light sensor.

An inertial sensor may comprise a combination of accelerometers and gyroscopes, which can be used for detecting a movement or an action of the user. An inertial sensor may be used to detect the speed and allure of the user while the user is carrying out an activity. As a different sport activity usually has a different speed range and head movement pattern, the detected speed and allure can be important parameters for identifying the activity.

A GPS sensor may be used to detect the geographic location of the user who is wearing or carrying the head lamp. The geographic location might be associated with a specific activity, e.g. a famous ski area. Thus, a GPS sensor can be used to identify a user activity as well.

A compass sensor may measure the orientation of user compared to the earth magnetic field. This can for example be used to determine the angular orientation of the user at any time during his or her activity. Added to a precision time tracker (precise day time) the compass obtained orientation of user can be compared to the sunlight's potency and orientation, helping to determine lighting needs.

A distance sensor may be used to detect the distance between the user and an object or a person, preferably based on the Time of Flight (ToF) principle, wherein the measurement is based on the time difference between the emission of a signal and its return to the sensor, after being reflected by the object or the person. Different types of signals can be used with the ToF principle, wherein the most common distance sensors are based on sound and light signals, e.g. ultrasonic sensors, Radar sensors, Lidar sensors, photo detectors in visible or infrared spectral regions and so on. Based on the distance information between the user and the object, the beam of the light can be adjusted. For example, when a user who is camping starts to read a book or a map, the distance sensor detects a nearby object, and will properly adjust the lighting beam or switch to a lighting beam which is suitable for close distance actions such as reading.

A time tracking sensor such as a perennial watch may be used to record the absolute time as well as time period of usage. For example, a specific place is a favorite sport destination for hiking in summer and skiing in winter, so that the time information can help to classify the user activity. Furthermore, if a user has an everyday routine, e.g. walking after dinner at 8 O'clock in the evening, the time tracking sensor can also be used for training the AI unit and for identifying the user habit accordingly.

An optical detector may be used for sensing ambient light. The control unit can be adapted to control the brightness of the light beam based on environmental lighting conditions, e.g. a dark environment needs a bright lighting beam, while in the sun the lighting is not needed any more.

It should be noted that further sensors, other than the sensors discussed above, which are suitable to detect a user action, a user movement or the environment may also be used. It is up to a person skilled in the art to choose any suitable sensors to implement the present invention Preferably, the activity classification unit is adapted to classify the activity of the user as least based on the data transmitted from the at least one sensor of the lamp. Further sensors, other than the introduced sensors above, can also be used, wherein the activity classification unit is preferably adapted to use pre-determined or trained algorithms which compare the sensor data with pre-determined conditions or thresholds for identifying the user activity, or to develop rules or algorithms with machine learning abilities for identifying the user activity.

The control unit is preferably adapted to control the beam of the at least one light source further based on the transmitted data from the at least one sensor. The control unit can either use pre-determined algorithms or rules, which compare the sensor data with pre-determined conditions or thresholds for identifying user actions or environment conditions, or develop algorithms or rules using machine learning based on the sensor data as training data.

In a preferred embodiment according the first aspect of the invention, the lamp preferably further comprises an AI on-off unit, wherein the AI on-off unit is adapted to be operated by the user to activate or deactivate the AI unit. By providing such an AI on-off unit, the user has the choice of whether or not to activate the AI unit. If a user would like to completely manually set the lighting himself or use the manual setting for a specific time period, he could just operate the AI on-off unit by e.g. pressing a button to deactivate the AI unit. If at a later time he would like to use the AI unit again, what he needs to do is just to activate the AI unit.

Preferably, the lamp further comprises at least one manual setting unit, which is adapted to be operated by the user to manually control the beam of said at least one light source when the AI unit is deactivated, and/or is adapted to be operated by the user to further adjust the beam of said at least one light source when the AI unit is activated. The at least one manual setting unit is preferably adapted to adjust the brightness of the light and/or the geometry of the light. If a user has deactivated the AI unit, he may further use the at least one manual setting unit to control the beam of the light source. Nevertheless, if the AI unit is activated, the user may still use the at least one manual setting unit to adjust the beam of said at least one light source if he is not satisfied with the lighting result proposed by the AI unit, or he would like to further carry out some fine-tuning of the light beam.

In a further preferred embodiment according to the first aspect of the invention, the AI unit is preferably adapted to access preloaded training data, which are used to train the activity classification unit and/or the control unit. Preloaded training data may be training data which are provided by the manufacturer, wherein the manufacturer may collect the training data from various test users before the lamp is put onto the market. In this way, algorithms for classifying user activities and/or algorithms for controlling the beam of the light source could be trained by the data collected from these test users, wherein the manufacturer, if time and cost permitted, could involve a lot of test users of various ages and/or from various behavior groups, so that the trained algorithms would be able to provide relative satisfying control results. A person skilled in the art may implement any kind of algorithms or learning models for classifying the user activity, which can include, inter alia, Convolutional Neural Networks, Bayesian Networks, Support Vector Machines or Decision Trees.

In order to better adapt the lamp to users with an individual preference or a different perception of the lighting, the AI unit preferably further comprises a user-specific training data unit, which is adapted to store user-specific control data resulted from user operations on the at least one manual setting unit, wherein the user specific control data are adapted to train the control unit. The control data preferably refer to the brightness and/or geometry of the beam of the at least one light source. No matter if the AI unit is activated or deactivated, the user can always use the at least one manual setting unit to control the light beam. The control data of the manual setting, or the difference between the proposed control data from the AI unit and the control data of the manual setting, will be stored and used for further training the control algorithms. By deploying this learning process, the AI unit will be gradually adapted to the user-specific preference and would thus become more and more "intelligent". Again, a person skilled in the art may also implement any kind of algorithms or learning models for controlling the beam of the at least one light source, which can include, inter alia, Convolutional Neural Networks, Bayesian Networks, Support Vector Machines or Decision Trees.

According to a second aspect of the invention, the object is achieved by a method for controlling at least one light source of a portable lamp, wherein the lamp is preferably a headlamp, which is adapted to be worn or carried by a user, comprising: classifying an activity which the user is currently carrying out without any manual setting by the user, controlling the beam of said at least one light source based on the classified activity of the user.

As already discussed, with the automatic classification of a user activity, a pre-setting of the activity by the user using an App on a computer or a smartphone is not needed any more, which not only saves time of the user, but also enables a more intuitive and convenient user experience. Based on the classified activity, the control unit uses activity-specific profiles and controlling rules to automatically control the beam of the at least one light source, including the geometry and the brightness of the beam, so that the control is not only completely automatic but also activity-specific.

In a preferred embodiment according to the second aspect of the invention, the lamp comprises an AI unit, wherein the AI unit comprises an activity classification unit for classifying an activity of the user and a control unit for controlling the beam of said at least one light source, wherein the method further comprises training the classification unit using preloaded training data.

Preferably, the lamp comprises an AI on-off unit, wherein the AI on-off unit is adapted to be operated by the user to activate or deactivate the AI unit.

The lamp preferably further comprises at least one manual setting unit, which is adapted to be operated by the user to manually control the beam of said at least one light source when the AI unit is deactivated, and/or is adapted to be operated by the user to further adjust the beam of the light source when the AI unit is activated.

According to a further preferred embodiment according to the second aspect of the invention, the method further comprises: preloading data for training at least one algorithm for classifying an activity of the user, training the at least one algorithm for classifying an activity of the user using the preloaded data.

Preferably, the method further comprises: storing user-specific control data resulted from user operations on the at least one manual setting unit, training at least one algorithm for controlling the beam of said at least one light source using the user-specific control data.

The advantages of the above preferred embodiments according to the second aspect of the invention refer to the accordingly discussed advantages under the first aspect of the invention, respectively.

According to a third aspect of the invention, the object is solved by the use of an AI unit in a portable lamp, preferably a headlamp, which is adapted to be worn or carried by a user, wherein the lamp comprises at least one light source, wherein the AI unit is able to control the beam of said at least one light source without any manual setting by the user, wherein the headlamp further comprises at least one manual setting unit, which is adapted to be operated by the user to manually control the beam of said at least one light source when the AI unit is deactivated, and/or is adapted to be operated by the user to further adjust the beam of said at least one light source when the AI unit is activated, wherein at least one controlling algorithm of the AI unit for controlling the beam of said at least one light source is trained by preloaded training data and/or user-specific control data resulted from user operations on the at least one manual setting unit.

According to the third aspect of the invention, the AI unit has a learning capability, wherein the at least one controlling algorithm of the AI unit may include, inter alia, Convolutional Neural Networks, Bayesian Networks, Support Vector Machines or Decision Trees, which can be trained by user-specific control data resulted from user operations on the at least one manual setting unit.

By training the one or more algorithms of the AI unit with user-specific control data, the AI unit learns the user preference or the user's perception of light, so that not only an automatic but also an user-specific control of the light beam is made possible, without the need of a pre-configuration of a user profile by the user on a computer or a smartphone.

In a preferred embodiment according to the third aspect of the invention, the lamp further comprises at least one sensor, wherein the captured sensor data of the at least one sensor are adapted to be transmitted to the AI unit, wherein the at least one sensor comprises at least one of the following: an inertial sensor, a GPS sensor, a compass sensor, a distance sensor, a time tracking sensor, an optical detector.

Specific embodiments of the present invention will be described below with reference to the attached drawings in which FIG. 1 shows a schematic view of a headlamp with an AI unit according to an embodiment of the invention.

Figure 1:
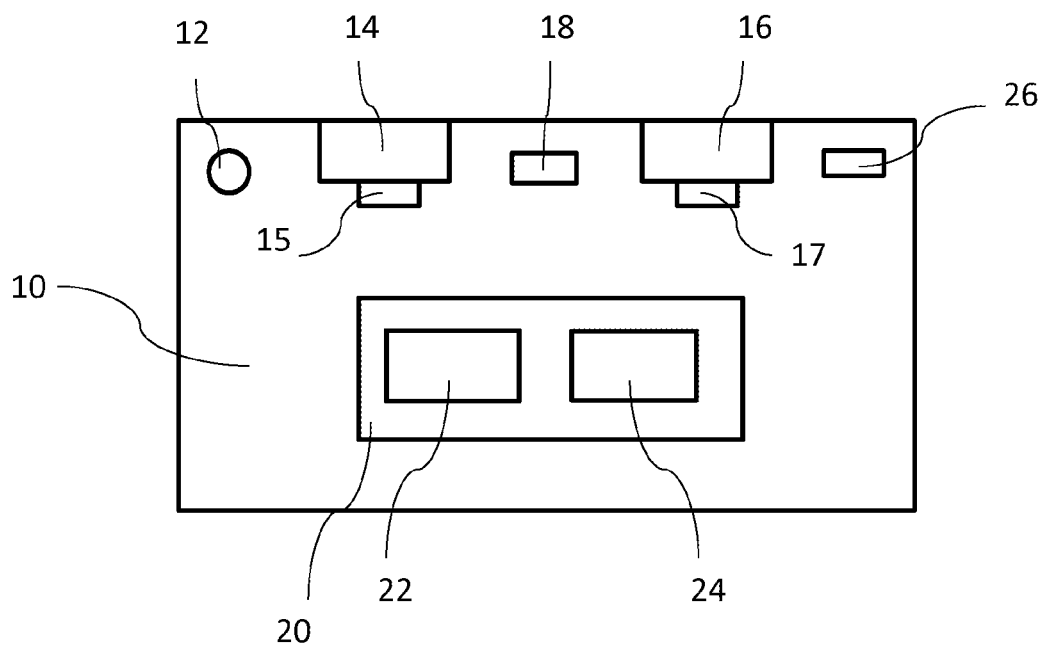

FIG. 1 illustrates a schematic view of a headlamp with an AI unit according to a first embodiment of the invention. The headlamp 10 comprises a power on-off unit 12, which is adapted to turn on or turn off the power of the headlamp. The headlamp 10 further comprises two dimmable light sources 14 and 16, wherein each of them comprises one or more LED diodes. The light source 14 may be adapted to produce a wide beam, and the light source 16 may be adapted to produce a focused beam. Each of the two light sources 14 and 16 is provided with a manual setting unit 15 and 17, respectively, wherein each manual setting unit 15 and 17 is adapted to be operated by the user to control the brightness of the respective light source. It is up to a person skilled in the art how to implement the manual setting units 15 and 17, wherein the manual setting units 15 and 17 could for example be implemented as a button or a knob for adjusting the brightness of the light sources 14 and 16, respectively.

The headlamp 10 may further comprise an AI unit 20, which is able to automatically control the light sources 14 and 16 without any manual setting of the user. The AI unit 20 comprises an activity classification unit 22, which is able to automatically classify an activity which the user is currently carrying out. The AI unit 20 further comprises a control unit 24, which is adapted to control the beam of the light sources 14 and 16 based on the classified activity of the user. An activity of the user refers to a sport or a leisure outdoor activity, which can be hiking, camping, skiing, walking or running etc. The possible activities which the headlamp can be used for are usually defined or preset by the manufacturer.

In order to automatically classify the activity of the user, the motions of the user and/or the nearby environment where the user is taking the activity need to be detected. Therefore, the headlamp 10 further comprises one or more sensors 18 for such detection, wherein the one or more sensors 18 comprise at least one of the following: an inertial sensor, a GPS sensor, a compass sensor, a distance sensor, a time tracking sensor, an optical detector.

The headlamp 10 further comprises an AI on-off unit 26, which is adapted to be operated by the user to activate or deactivate the AI unit 20. The AI on-off unit can also be implemented as a button or a knob. If a user does not want to use the AI unit 20, he may deactivate the AI unit 20 by operating the AI on-off unit 26, so that he only uses the manual setting units 15 and 17 to dim the light sources 14 and 16. However, even if the AI unit 20 is activated, the user can still use the manual setting units 15 and 17 to further dim the light sources 14 and 16 if the user is not satisfied with the proposed dimming results by the AI unit 20.

Figure 2:
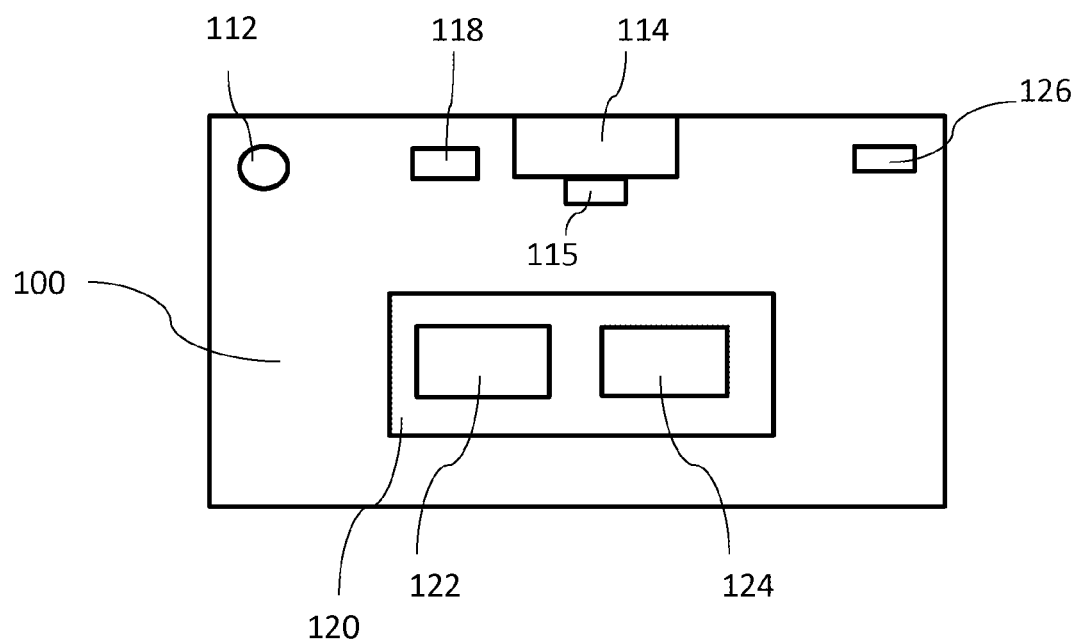
FIG. 2 shows a schematic view of a headlamp with an AI unit according to a further embodiment of the invention.

FIG. 2 shows a schematic view of a headlamp with an AI unit according to a further embodiment of the invention. Like the embodiment illustrated in FIG. 1, the headlamp 100 in FIG. 2 also comprises a power on-off unit 112, a manual setting unit 115, a light source 114, an AI unit 120, one or more sensors 118 and preferably an AI on-off unit 126.

The only difference between the headlamps illustrated in FIG. 1 and FIG. 2 is that the headlamp 100 in FIG. 2 has only one light source 114 instead of two light sources 14 and 16. Furthermore, not only the brightness, but also the geometry of the beam of the only one light source 114 may be adjustable, i.e. the light source 114 can be adjusted to have a wide beam, or a narrow beam, or a beam with any geometry. The light source 114 may comprise one or more LED diodes, wherein it is up to a person skilled in the art to implement any suitable optical systems or technologies for the light beam adjustment. Accordingly, the AI unit 120 as well as the manual setting unit 115 are not only able to control the brightness, but also the geometry of the beam of the light source 114. The manual setting unit 115 can be implemented as two buttons, one for adjusting the brightness of the light beam and the other for adjusting the geometry of the light beam. Furthermore, contactless adjustment solutions e.g. by using hand gestures are also imaginable. For example, upon detection of moving the hand higher or lower in front of the lamp via ToF technologies, the manual setting unit 115 adjusts the brightness of the light source 114, while upon detection of moving the hand farther or closer, the manual setting unit 115 adjusts the range of the light source 114.

A person skilled in the art could also use more than two light sources on his needs, so that the number and the implementation of the light sources as well as the according manual setting units may vary from those illustrated in FIG. 1 or FIG. 2.

Figure 3:
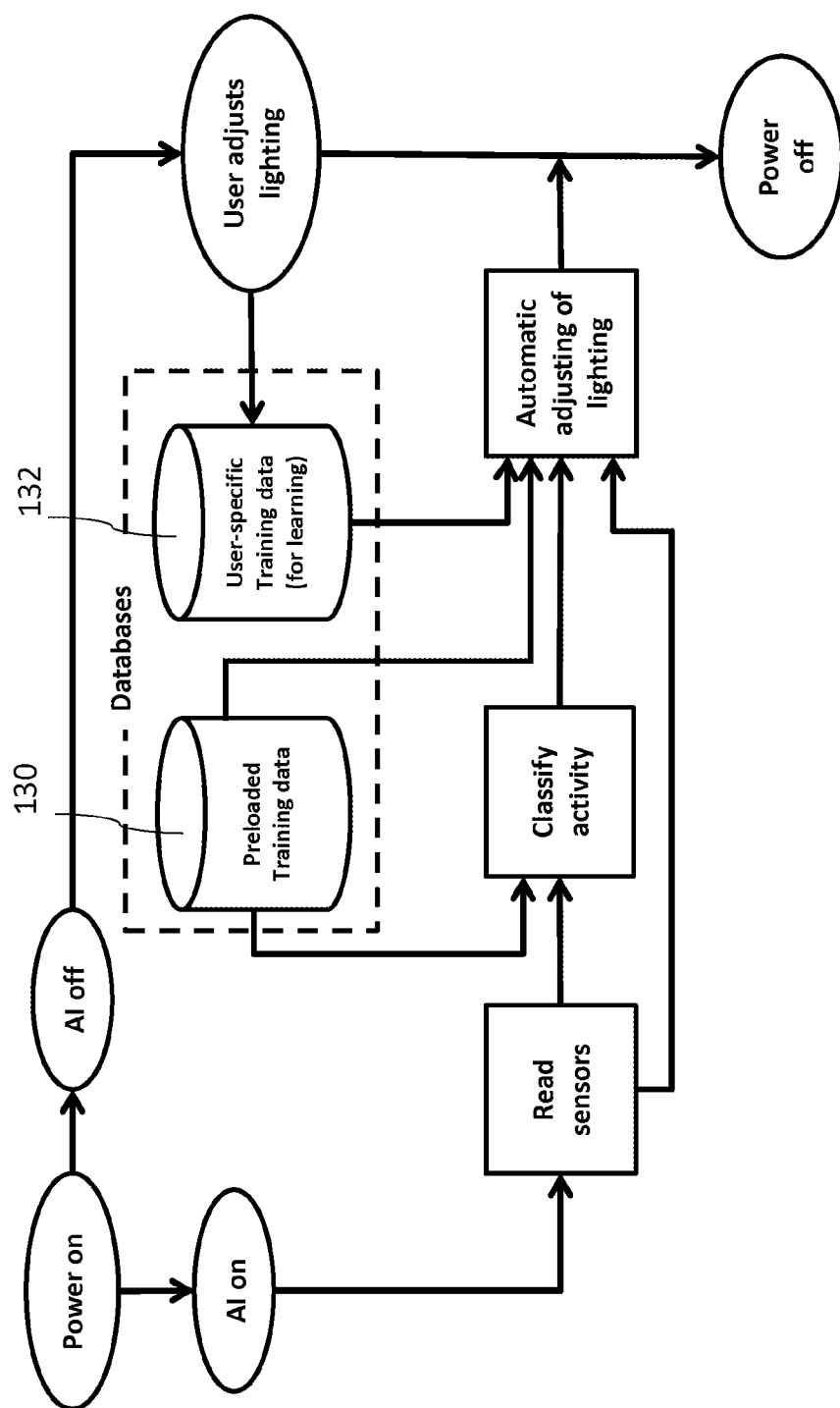
FIG. 3 shows a process for controlling the beam of at least one light source of a head lamp according to the embodiment of FIG. 1 or FIG. 2.

A process for controlling the beam of at least one light source of a headlamp with an AI unit is shown in FIG. 3, wherein the headlamp could for example be a headlamp of the embodiment shown in FIG. 1 or in FIG. 2. For simplicity's sake, in the following we use the embodiment illustrated in FIG. 2 for explaining the controlling process.

Figure 5:
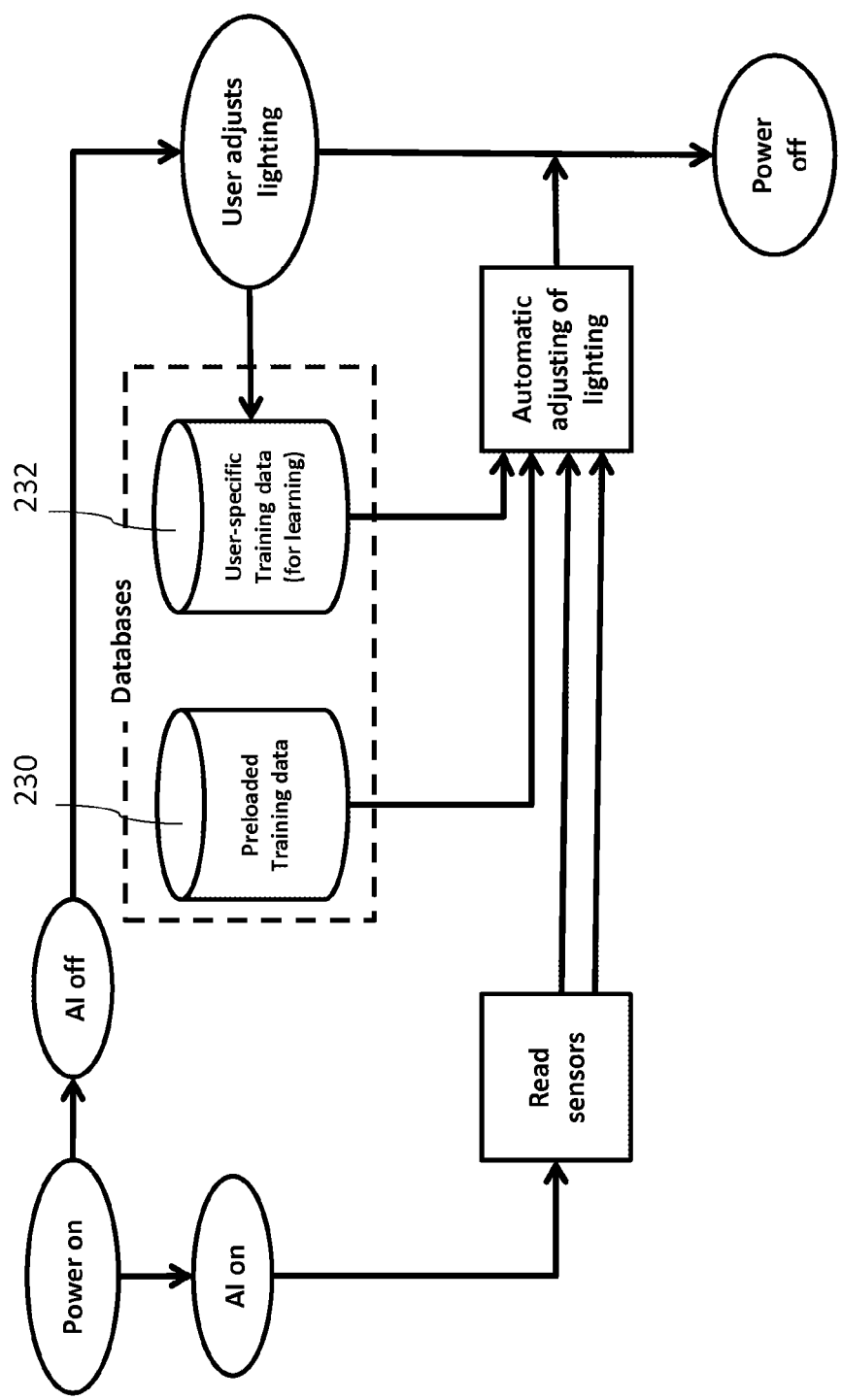
FIG. 5 shows a process for controlling the beam of at least one light source of a head lamp according to the embodiment of FIG. 4.

First of all, it should be noted that in FIG. 3 and FIG. 5, a rectangle-shaped box stands for an automatic process step, i.e. without any manual setting, while an oval-shaped box stands for a process step with a manual setting.

A user can operate on the power on-off unit 112 to turn on or turn off the power of the headlamp 100. In embodiments that feature an AI on-off unit 26, once the headlamp is turned on, the user can further operate on the AI on-off unit 26 to turn on or turn off the AI unit 120.

Once the AI unit 120 is turned on, the activity classification unit is adapted to read sensor data from at least one of the one or more sensors 118.

Based on the sensor data, the activity classification unit 122 uses one or more pre-determined algorithms to classify the activity the user is currently taking. The activity classification algorithms are preferably pre-trained by preloaded training data 130, wherein such training data 130 are preferably provided by the manufacturer, who collects the data from test persons for training the algorithms. It should be noted that the activity classification unit 122 may still have access to the preloaded training data 130 after the activity classification algorithms are pre-trained, wherein the preloaded training data may further by supplemented or updated with new data provided by the manufacturer for further training the algorithms. The preloaded training data 130 can be stored in the headlamp, or in an external data storage device, or in a cloud which can be accessed by the activity classification unit 122.

Once the user activity is classified or determined, the control unit 124 is adapted to use the according activity-specific control algorithm or algorithms to control the beam of the light source 114. The one or more control algorithms are also preferably pre-determined or pre-trained by the manufacturer. It should be noted that the pre-loaded training data 130 preferably further comprise training data for pre-training the one or more control algorithms for each activity of the control unit 124.

In the following some examples for activity-specific control of the beam of the light source 114 are given. For example:

The one or more control algorithms for the activity "camping" are adapted to mainly provide a wide lighting beam for enabling a broad vision of the environment and avoiding blinding the eyes of nearby persons when socializing, while the control algorithms for the activity "cycling" or "running" are adapted to provide a focused beam for illuminating the road ahead.

As the activity "cycling" has a higher speed than "walking", the one or more control algorithms for the activity "camping" should be adapted to provide more lighting power, i.e. a higher brightness of the light sources than those for the activity "walking".

It should be further noted that the one or more algorithms for user activity classification should preferably run at a speed fast enough to capture activity changes, such as the activity change from "walking" to "running", preferably within one second, more preferably with a frequency of at least 24 Hz, which is the minimal visual detection capacity of human eyes.

However, under the same user activity, the lighting beam still needs to be adjusted according to the environment or a movement or action of the user. Therefore, the one or more control algorithms of the control unit 124 for each activity are further adapted to control the beam of the light source 114 based on the environment parameters, or an action or a movement of the user, which are measured or detected by the one or more sensors 118.

In the following some examples for light beam control under one same user activity 114 are given. For example:

The one or more control algorithms for the activity "running" may be able to detect when the user stops running (e.g. lower GPS-speed, lower cadence) and subsequently to reduce the long-distance beam to avoid blinding the user because it is probable that the user stops running for checking his cellphone or a map.

Under the activity "skiing", by detecting user movements uphill and downhill, respectively, e.g. by using inertial sensors, the one or more control algorithms for the activity "skiing" can be adapted to set the beam stronger and with a mixed focus for downhill, and to set the beam weaker but focused for uphill.

Head orientation (measured via inertial units) can also be an important parameter for light beam controlling, wherein when the user raises his head, he is probably looking at the landscape or the sky, while when he lowers his head, he is probably looking at the road in the immediate front. Therefore, the one or more control algorithms for each activity can also be adapted to adjust the light beam based on the detected head position of the user.

Furthermore, as discussed above, the headlamp 100 also comprises a manual unit 115, which is operated by the user to manually adjust the beam of the light source 114 when the AI unit 120 is deactivated, or when the AI unit is activated and the user is not completely satisfied with the proposed control result of AI unit.

The user-specific control data resulted from user operations on the manual setting unit 115 are stored as user-specific training data 132, which are used for further training the algorithms of the control unit 124. The user-specific training data 132 can be control data of the manual setting, or the difference between the proposed control data from the AI unit and the control data of the manual setting, wherein the user-specific training data 132 are preferably stored and/or updated in the headlamp 100. In this way, the control unit 124 has the capability to learn from the manual settings of the user and is gradually adapted to control the light beam according to the user preference. A person skilled in the art may implement any kind of algorithms or learning models for controlling the beam of the light source 114, which can include e.g. Convolutional Neural Networks, Bayesian Networks, Support Vector Machines or Decision Trees.

Figure 4:
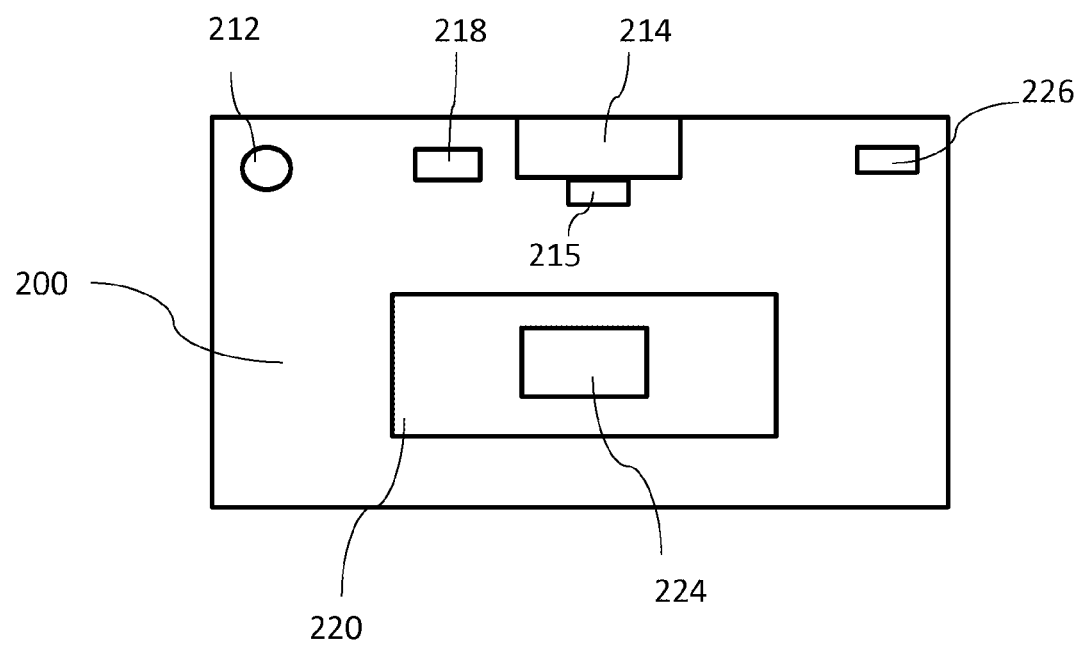
FIG. 4 shows a schematic view of a headlamp with an AI unit according to another embodiment of the invention.

FIG. 4 illustrates another embodiment of the headlamp, wherein the headlamp 200 also comprises a power on-off unit 212, which is adapted to turn on or turn off the power of the headlamp 200, an adjustable light source 214, and a manual setting unit 215, which is adapted to control not only the brightness but also the geometry of the respective light source 214. The headlamp 200 further comprises one or more sensors 218 for detecting e.g. a user movement, a user action, or the environment.

The headlamp 200 further comprises an AI unit 220, which is able to automatically control the beam of the light source 214 without any manual setting of the user. The difference between the embodiments illustrated in FIG. 2 and FIG. 4 is that the AI unit 200 in FIG. 4 only comprises a control unit 224, wherein a user activity classification unit is not provided.

FIG. 5 illustrates a control process for controlling the beam of the light source 214 of the headlamp 200. A user can also operate on the power on-off unit 212 to turn on or turn off the power of the headlamp 200. Once the headlamp is turned on, the user can further operate on the AI on-off unit 226 to turn on or turn off the AI unit 220.

Once the AI unit 220 is turned on, the control unit 224 is adapted to read sensor data from at least one of the one or more sensors 218.

Based on the sensor data, the control unit 224 is adapted to use one or more control algorithms to control the beam of the light source 214. The one or more control algorithms are preferably pre-determined, or pre-trained by pre-loaded training data 230 provided by the manufacturer, who collects the data from test persons for training the one or more algorithms. It should be noted that the control unit 224 may still have access to the preloaded training data 230 after control algorithms are pre-trained, wherein the preloaded training data may further by supplemented or updated with new data provided by the manufacturer for further training the one or more algorithms. The preloaded training data 230 can be stored in the headlamp, or in an external data storage device, or in a cloud which can be accessed by the control unit 224.

In the following some examples for controlling the beam of the light source 214 are given. For example:

The control unit 224 is adapted to increase the brightness of the beam of the light source 214, if the environment is very dark, and to reduce the brightness of the beam of the light source 214, if the environment is less dark, wherein the darkness of the environment can be detected by an optical detector.

The control unit 224 is adapted to switch the beam of light source 214 from a focused beam to a wide beam, if a person stops running and starts to read a map, wherein the action of the user can e.g. be detected by a speed sensor, and the map, i.e. a nearby object, can be detected by a distance sensor.

The user may further use the manual unit 215 to manually adjust the beam of the light source 214 when the AI unit 220 is deactivated, or when the AI unit 220 is activated and the user is not completely satisfied with the proposed control result of AI unit, especially for the case that the user has a different perception of the brightness of light than an average person.

The user-specific control data resulted from user operations on the manual setting unit 215 are stored as user-specific training data 232, which are used for further training the one or more algorithms of the control unit 224. In this way, the control unit 224 has the capability to learn from the manual settings of the user and is gradually adapted to control the light beam according to the user preference. A person skilled in the art may also implement any kind of algorithms or learning models for controlling the beam of the light source 214, which can include e.g. Convolutional Neural Networks, Bayesian Networks, Support Vector Machines or Decision Trees.

The invention claimed is:

1. An apparatus, comprising:
   at least one light source;
   an artificial intelligence (AI) unit including an activity classification unit and a control unit; and
   an AI on-off unit configured to be operated by the user to activate or deactivate the AI unit, wherein the AI unit is configured to access preloaded training data to train the activity classification unit or the control unit,
   wherein the activity classification unit is configured to automatically classify an activity which the user is currently carrying out without any manual setting by the user, and
   wherein the control unit is adapted to control a beam of the at least one light source at least based on the classified activity of the user.

2. The apparatus according to claim 1, further comprising at least one sensor,
   wherein captured sensor data of the at least one sensor is configured to be transmitted to the activity classification unit or to the control unit, and
   wherein the at least one sensor comprises at least one of the following: an inertial sensor, a GPS sensor, a compass sensor, a distance sensor, a time tracking sensor, or an optical detector.

3. The apparatus according to claim 2, wherein the activity classification unit is configured to classify the activity of the user based on the captured sensor data.

4. The apparatus according to claim 3, wherein the control unit is configured to control the beam of the at least one light source based on the captured sensor data.

5. The apparatus according to claim 1, further comprising at least one manual setting unit configured to be operated by the user to manually control the beam of the at least one light source when the AI unit is deactivated, or to be operated by the user to further adjust the beam of the at least one light source when the AI unit is activated.

6. The apparatus according to claim 5, wherein the AI unit comprises a user-specific training data unit configured to store user-specific control data resulted from user operations on the at least one manual setting unit, and
wherein the user-specific control data is configured to train the control unit.

7. A method for controlling an apparatus having at least one light source, the method comprising:
operating an AI on-off unit to activate or deactivate an artificial intelligence (AI) unit of the apparatus;
preloading data for training at least one algorithm for classifying an activity of a user;
training the at least one algorithm for classifying the activity of the user using the preloaded data;
classifying using the at least one algorithm the activity which the user is currently carrying out without any manual setting by the user when the AI unit is activated; and
controlling a beam of the at least one light source based on the classified activity of the user when the AI unit is activated.

8. The method according to claim 7, wherein the classifying comprises training the apparatus to classify the activity of the user using preloaded training data.

9. The method according to claim 7, further comprising operating at least one manual setting unit of the apparatus by the user to manually control the beam of the at least one light source when the AI unit is deactivated or to further adjust the beam of the light source when the AI unit is activated.

10. The method according to claim 9, wherein the classifying comprises:
storing user-specific control data resulted from user operations on the at least one manual setting unit; and
training the at least one algorithm to control the beam of the at least one light source using the user-specific control data.

11. The method according to claim 7, further comprising capturing sensor data of at least one sensor.

12. The method according to claim 11, wherein the classifying comprises classifying using at least one algorithm for classifying an activity the user which is being currently carrying out without any manual setting by the user based on the captured sensor data.

13. The method according to claim 11, wherein the controlling comprises controlling the beam of the at least one light source based on the captured sensor data.

14. The method according to claim 7, further comprising:
storing user-specific control data resulted from user operations on the at least one manual setting unit, and
training at least one algorithm for classifying an activity of the user using the user-specific control data.

15. A method for operating an artificial intelligence (AI) unit in an apparatus having at least one light source, the method comprising:
operating an AI on-off unit to activate or deactivate the AI;
controlling a beam of the at least one light source without any manual setting by the user when the AI unit is activated;
operating at least one manual setting unit by the user to further adjust the beam of the at least one light source when the AI unit is activated; and
pre-loading training data or user-specific control data resulted from user operations on the at least one manual setting unit to train controlling the beam of the at least one light source when the AI unit is activated.

16. The method according to claim 15, further comprising operating the at least one manual setting unit by the user to manually control the beam of the at least one light source when the AI unit is deactivated.

* * * * *